(12) United States Patent
Tai et al.

(10) Patent No.: US 8,602,191 B2
(45) Date of Patent: Dec. 10, 2013

(54) CLUTCH ASSEMBLY

(75) Inventors: Wen-Sheng Tai, New Taipei (TW); Wei-Chou Chiu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 289 days.

(21) Appl. No.: 13/281,452

(22) Filed: Oct. 26, 2011

(65) Prior Publication Data
US 2012/0325613 A1 Dec. 27, 2012

(30) Foreign Application Priority Data
Jun. 24, 2011 (TW) .............................. 100122347 A

(51) Int. Cl.
F16D 13/22 (2006.01)
F16D 11/10 (2006.01)
F16D 11/04 (2006.01)

(52) U.S. Cl.
USPC ......................................... 192/69.91; 192/92

(58) Field of Classification Search
USPC ......................................... 192/69.91, 92, 108
See application file for complete search history.

(56) References Cited

U.S. PATENT DOCUMENTS 4,607,734 A * 8/1986 Watashi et al. ............. 192/69.91
5,232,140 A * 8/1993 Gregory et al. ................. 226/74
6,244,406 B1 * 6/2001 Kolbe et al. ................. 192/69.82

* cited by examiner

*Primary Examiner* — David D Le
*Assistant Examiner* — Colby M Hansen
(74) *Attorney, Agent, or Firm* — Altis Law Group, Inc.

(57) ABSTRACT

The clutch assembly includes a controlling lever, a push bar, a locking shaft, a guiding sleeve, a driving sleeve, and a restoring spring member. The locking shaft has several locking protrusions and several guiding protrusions formed thereon. The push bar is driven by the control lever to push the locking shaft axially move along a rotation axis, and the guiding protrusions therefore engage with the driving sleeve. The driving sleeve is driven to rotate for making the locking protrusions aligned with the locking grooves. The restoring spring member bounds and pushes the locking shaft to an engaging position while the locking protrusions are received in the locking grooves. Thus, the clutch assembly is easily switched from a disengagement status to an engagement status.

3 Claims, 7 Drawing Sheets

CLUTCH ASSEMBLY

BACKGROUND

1. Technical Field

The present disclosure relates to clutch assembly.

2. Description of Related Art

A conventional clutch assembly is composed of several gear wheels axially connected to each other. However, such clutch assembly has the following problems: first, the clutch assembly requires a continuously force to be kept in an engagement status, which uses a great deal of electrical power. Second, an inaccurate positioning of the gear wheels would lead them to become unaligned with each other, which increases the friction between their teeth. Also, noise during processing and abrasion of teeth become serious. Last, such clutch assembly has a complicated structure, which is usually made of more than ten components and leads to the high cost of production. As a result, a clutch assembly solving the above-mentioned problems is required.

BRIEF DESCRIPTION OF THE DRAWINGS

The components of the drawings are not necessarily drawn to scale, the emphasis instead being placed upon clearly illustrating the principles of the embodiments of the clutch assembly. Moreover, in the drawings, like reference numerals designate corresponding parts throughout several views.

DETAILED DESCRIPTION

The clutch assembly of the present disclosure can be applied to various electronic apparatuses, such like a printer. By switching the clutch assembly between a disengagement status and an engagement status, the power transmission of the printer can be controlled. The following description will show an exemplary embodiment applying the clutch assembly to a printer, and the printer includes a base body, a first driving unit and a second driving unit.

Figure 1:
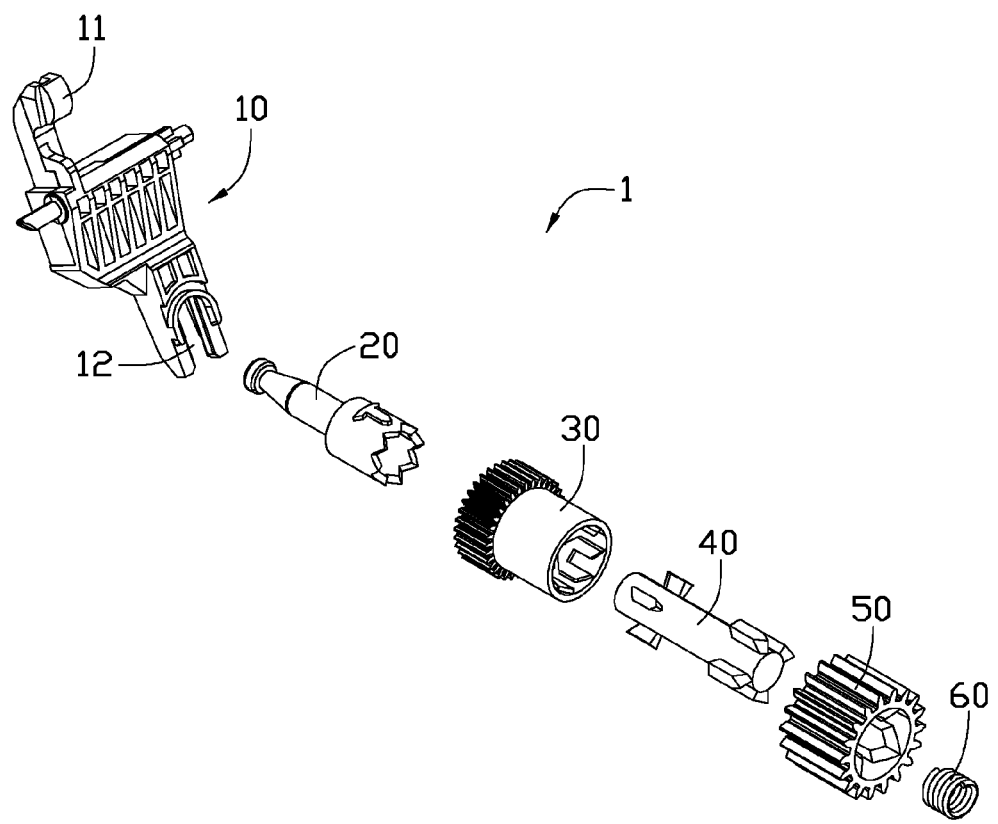
FIG. 1 is an exploded view of the clutch assembly, according to an exemplary embodiment of the present disclosure.

Referring to FIG. 1, which is an exploded view of the clutch assembly of the present disclosure, the clutch assembly 1 includes a control lever 10, a push bar 20, a guiding sleeve 30, a locking shaft 40, a driving sleeve 50, and a restoring spring member 60. The control lever 10 is pivotedly coupled to the base body (not shown) and includes a driven portion 11 and a clamping portion 12 respectively located on the two ends of the control lever 10. The driven portion 11 is adjacent to an inkjet nozzle (not shown) of the printer, while the inkjet nozzle is exemplified to the first driving unit in this embodiment.

Figure 2:
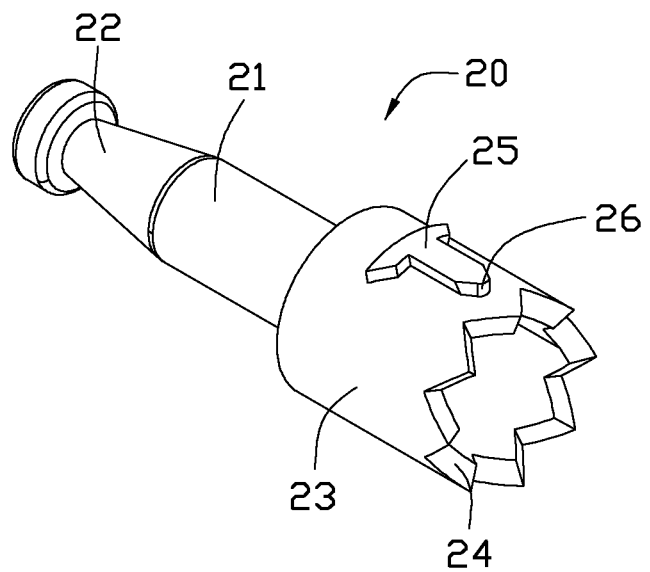
FIG. 2 is a perspective view illustrating the push bar.

Referring to FIG. 2 and FIG. 1, the push bar 20 is composed of a tapered structure 22, a conic body 21 and a cup 23. Preferably, the cup 23 is formed with a plurality of cusp structures 24 on the edge. One end of the push bar 20 located on the tapered structure 22 is defined a first end while the opposing end of the push bar 20 is defined a second end. The first end of the push bar 20 is mechanically coupled with the control lever 10, and the push bar 20 is therefore driven to axially move along a rotation axis. In this embodiment, the first end of the push bar 20 is tightly clamped by the clamping portion 12. The push bar 20 further has a T-shaped stopper 25 formed on the cup 23 at the second end, and the T-shaped stopper 25 includes a latch 26 towards the cusp structures 24.

Figure 3:
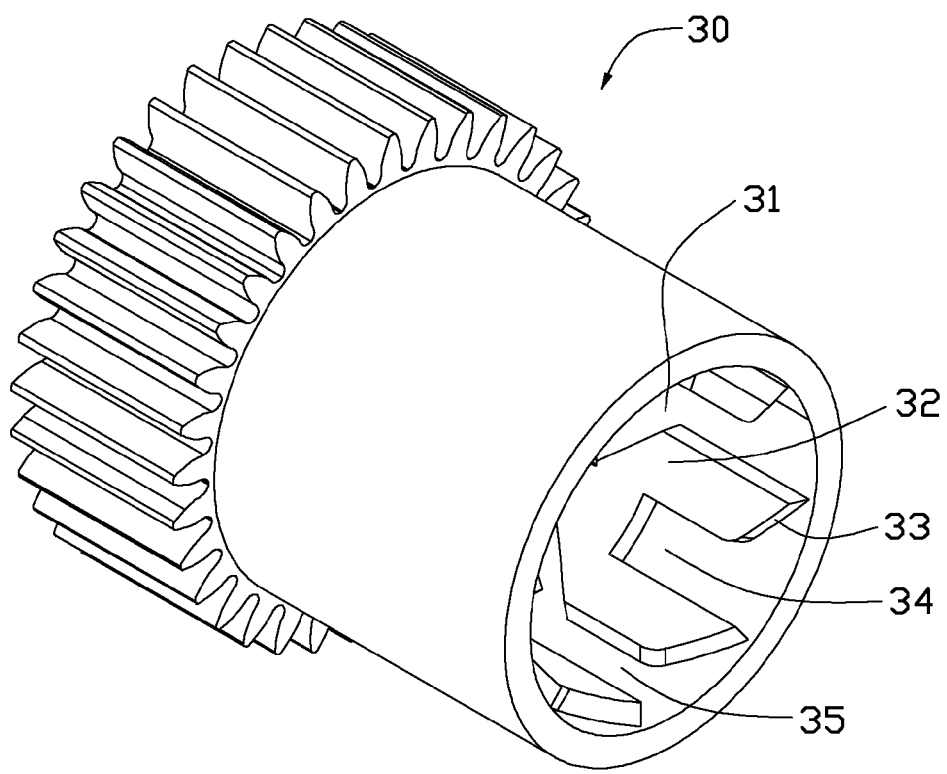
FIG. 3 is a perspective view illustrating the guiding sleeve.

Referring to FIG. 3 and FIG. 1, the guiding sleeve 30 is a hollow cylinder having a cavity 31 inside, comprising a plurality of spaced U-shaped blocking protrusions 32 formed on an internal side wall of the cavity 31. Each blocking protrusion 32 has two legs, while a locking groove 34 is formed between the two legs. At least one leg has a second slanted end face 33. The guiding sleeve 30 further comprises several releasing channels 35 formed between each two adjacent blocking protrusions 32. The guiding sleeve 30 is immovable along the rotation axis and rotatable around the rotation axis.

Figure 4:
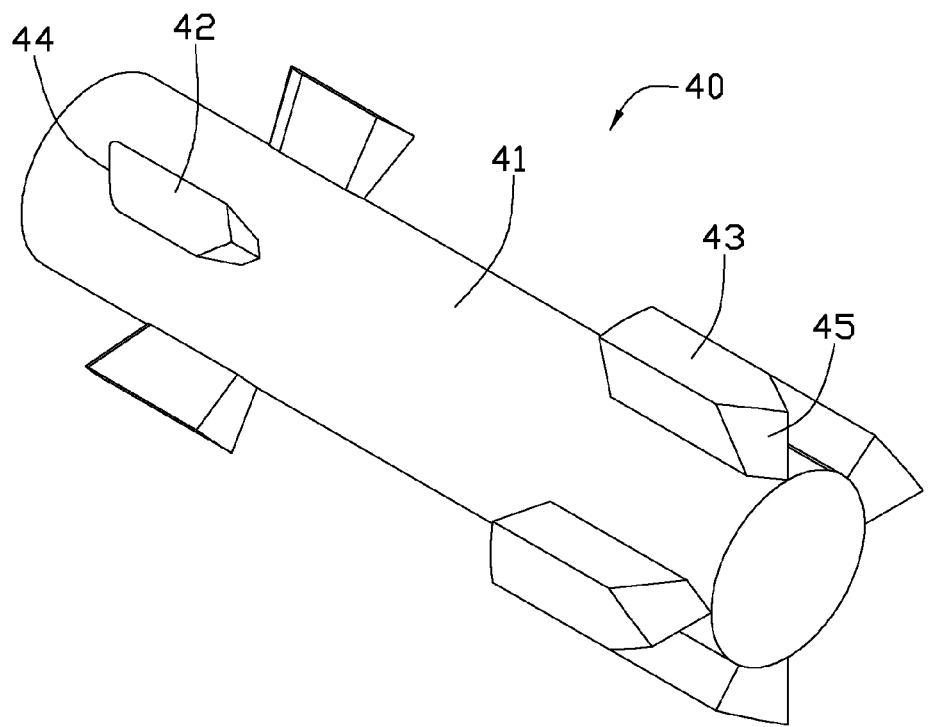
FIG. 4 is a perspective view illustrating the locking shaft.

Referring to FIG. 4 and FIG. 1, the locking shaft 40 includes a shaft 41 defined a first end and an opposing second end, and the second end is to be engagingly received in the cup 23 of the push bar 20. The locking shaft 40 further includes several parallel elongated locking protrusions 42 formed on the shaft 41 at the second end, and several parallel elongated guiding protrusions 43 formed on the shaft 41 at the first end. Each guiding protrusion 43 is not aligned with the locking protrusions 42. In this embodiment, the locking shaft 40 has four guiding protrusions 43 and four locking protrusions 42.

Moreover, each locking protrusion 42 has a first slanted end face 44 toward the second end of the shaft 41, and each guiding protrusion 43 has a cusp end 45 toward the first end of the shaft 41. The first slanted end faces 44 matches the second slanted end faces 33 of the blocking protrusions 32(shown in FIG. 3) formed in the guiding sleeve 30.

Figure 5:
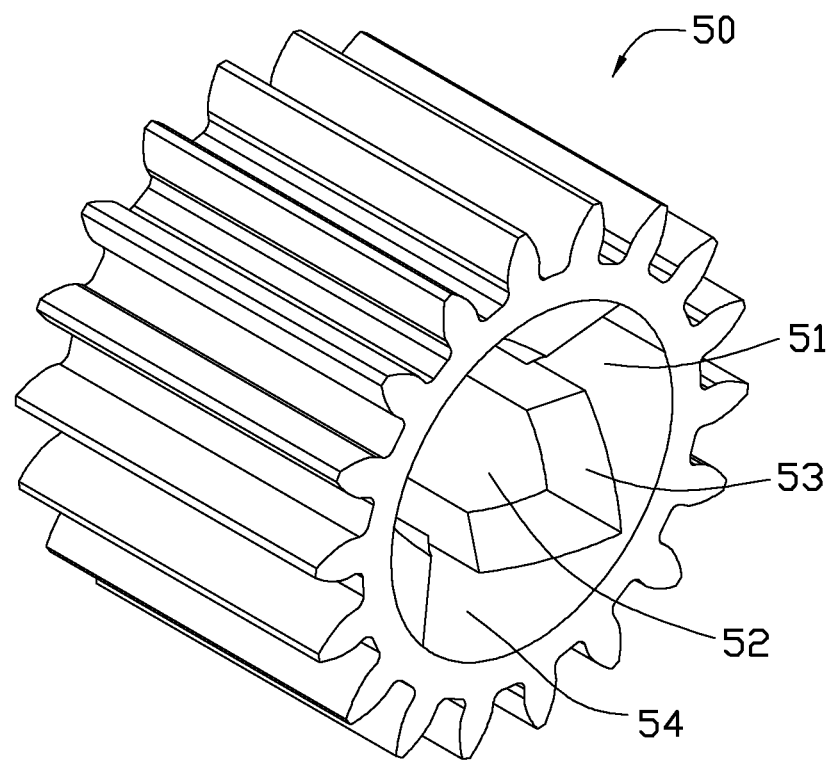
FIG. 5 is a perspective view illustrating the driving sleeve.

Referring to FIG. 5 and FIG. 1, the driving sleeve 50 is a hollow cylinder having a cavity 51 and formed with a plurality of outer teeth on its outer circumferential surface. The driving sleeve 50 has several retaining protrusions 52, which can be but are not limited to four retaining protrusions 52 in this embodiment, spaced from each others and formed on an internal side wall of the cavity 51. Each two adjacent retaining protrusions 52 form an engaging channel 54 therebetween. Each retaining protrusion 52 has at least a tip end with opposite slanted end faces 53 toward the locking shaft 40, and the shape of the slanted end faces 53 matches with the two opposite slanted faces on each of the cusp ends 45 of the guiding protrusions 43 of the locking shaft 40. In this embodiment, each retaining protrusion 52 has two tip ends as being performed a symmetrical shape. The driving sleeve 50 is arranged along the rotation axis and communicated with the second driving unit (not shown) for being driven thereby.

Figure 6:
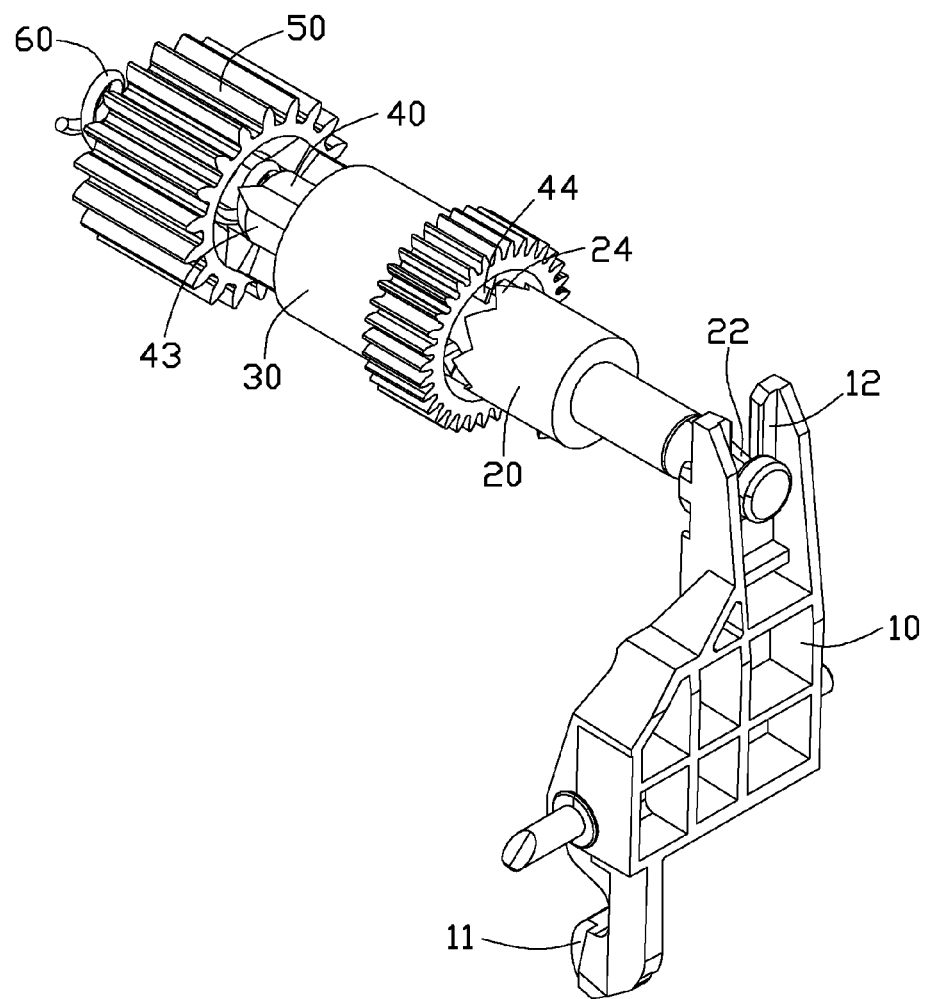
FIG. 6 is a perspective view of the clutch assembly in a disengagement status.

FIG. 6 shows the clutch assembly 1 in assembly when it is in a disengagement status. The clamping portion 12 of the control lever 10 tightly clamps the tapered structure 22 of the push bar 20. The second end of the locking shaft 40 is engagingly received in the cup 23 of the push bar 20 as the locking protrusions 42 are abutted by the cusp structures 24. The locking shaft 40 is in a disengaging position, while the locking protrusions 42 are aligned to the releasing channel 35 in the cavity 31 of the guiding sleeve 30, and the guiding protrusions 43 are aligned to the engaging channels 54 in the driving sleeve 50. The restoring spring member 60 is a compressible spring coil in this embodiment, having a first end fixed to the base body (not shown) and an opposing second end fixed to the first end of the locking shaft 40.

Figure 7:
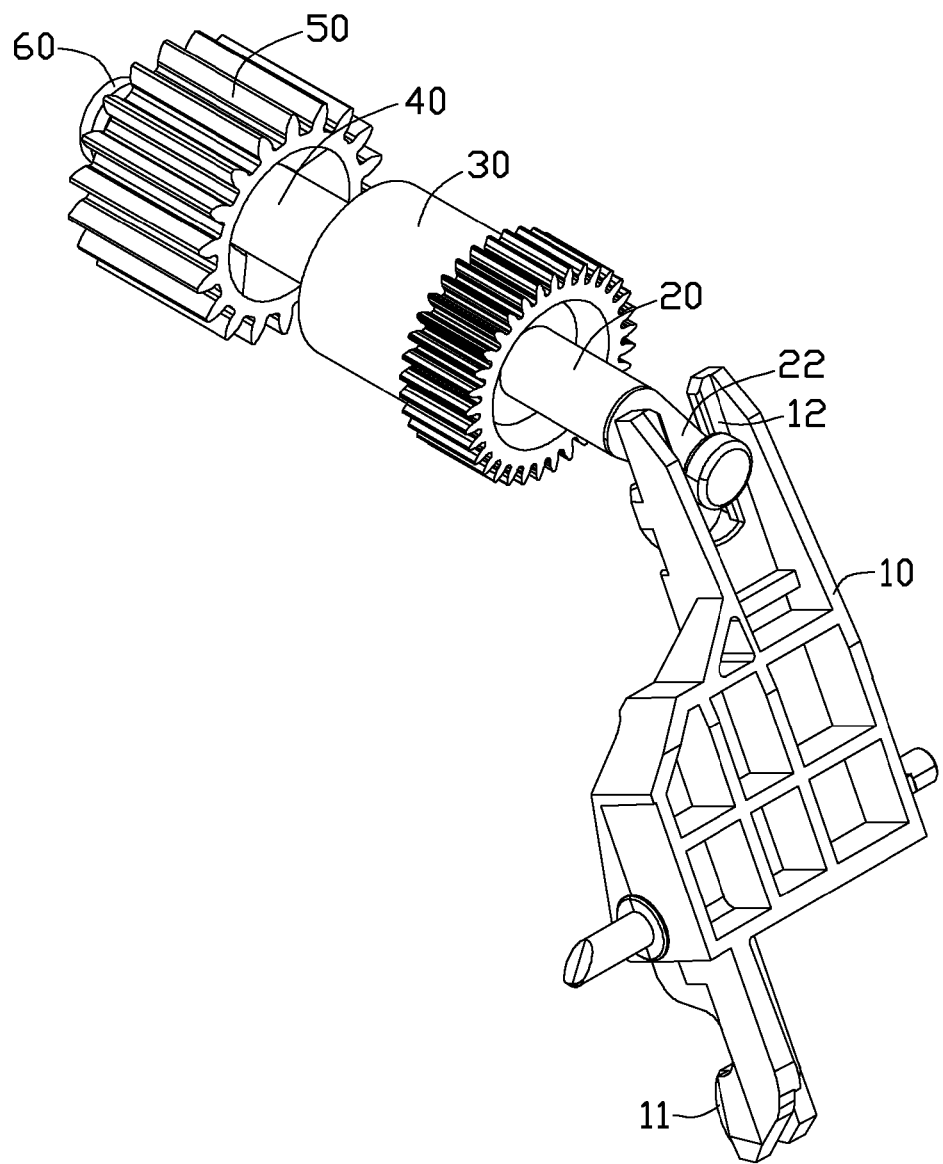
FIG. 7 is a perspective view of the clutch assembly in an engagement status.

Referring to FIG. 7, to switch the clutch assembly 1 from the disengagement status to the engagement status, in a first step, the first driving unit e.g. the inkjet nozzle (not shown) functions and forces the driven portion 11 of the control lever 10 with a horizontal thrust. Since the control lever 10 is pivotedly coupled to the base body (not shown), the control lever 10 rotates around a pivot and its clamping portion 12 sequentially pushes the push bar 20 to axially move along the rotation axis toward the guiding sleeve 30.

The locking shaft 40 is pushed by the push bar 20 and axially moves along the rotation axis. The locking protrusions 42 are pushed by the cusp structures 24 and slide through the releasing channels 35 in the guiding sleeve 30. The push bar 20 moves until its T-shaped stopper 25 (not shown in FIG. 6 and FIG. 7) is retained by two adjacent blocking protrusions 32 in the guiding sleeve 30, as the latch 26 of the T-shaped stopper 25 is inserted into the releasing channel 35 between the aforesaid two blocking protrusions 32. Meanwhile, the guiding protrusions 43 slide into and engage with the engaging channels 54 in the driving sleeve 50, and the restoring spring member 60 is compressed by the first end of the locking shaft 40.

In a second step, the driving sleeve 50 is driven by the second driving unit (not shown) to rotate around the rotation axis with a predefined angle. Since the locking shaft 40 is now engaged with the driving sleeve 50, the locking shaft 40 also rotates around the rotation axis in the predefined angle, substantially aligning the locking protrusions 42 to the locking grooves 34 in the guiding sleeve 30.

In a third step, the inkjet nozzle (not shown) stops pushing the driven portion 11 of the control lever 10. At this time, the compressed restoring spring member 60 applies a pushing force to the locking shaft 40, and the locking shaft 40 axially moves backwardly to an engaging position. Each locking protrusion 42 is directed to move into a locking groove 34 of the corresponding locking protrusion 32, as the first slanted face 44 of each locking protrusion 42 is guided by the second slanted end face 33. Therefore the locking shaft 40 engages with the guiding sleeve 30. Meanwhile, the guiding protrusions 43 still keep engaging with the engaging channels 54 of the driving sleeve 50.

As mentioned above, the clutch assembly 1 is converted to the engagement status, and the locking shaft 40 and the guiding sleeve 30 can be driven by the driving sleeve 50 to rotate around the rotation axis, therefore transmitting the power. Comparing to the prior art, the present disclosure does not require continuous electrical power to maintain such engagement status.

Similarly, to switch the clutch assembly 1 from the engagement status to the disengagement status, the inkjet nozzle (not shown) functions again and drives the control lever 10 to push the push bar 20. The push bar 20 pushes the locking shaft 40 to compress the restoring spring member 60 and the locking protrusions 42 will thereby leave out the locking groove 34, while the guiding protrusions 43 still engage with the engaging channel 54 of the driving sleeve 50.

Then, the driving sleeve 50 rotates around the rotation axis with the predefined angle. Thus, the locking protrusions 42 are substantially aligned to the releasing channel 35. When the force provided by the inkjet nozzle disappears, the restoring spring member 60 bounds and pushes the locking shaft 40 to axially move backward. The locking protrusions 42 thereby slide through the releasing channels 35. As result, the locking shaft 40 is back to the disengaging position, and the clutch assembly 1 returns to the disengagement status.

Through the above-mentioned process, the engagement status and the disengagement status of the clutch assembly 1 can be easily switched, and a continuous force to maintain the clutch assembly 1 in the engagement status is not needed any more.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A clutch assembly for mounting in an electronic apparatus, the electronic apparatus having a base body, the clutch assembly comprising:
   a control lever for being pivotally coupled to the base body;
   a push bar having a first end mechanically coupled with the control lever and a cup at an opposing second end thereof, the cup having a T-shaped stopper formed thereon, the control lever configured for driving the push bar to axially move along a rotation axis;
   a locking shaft aligned with the push bar, the locking shaft comprising:
      a shaft having a first end and an opposing second end, the second end engagingly received in the cup;
      a plurality of parallel elongated locking protrusions formed on the shaft at the second end, each of the locking protrusions having a first slanted end face; and
      a plurality of parallel elongated guiding protrusions formed on the shaft at the first end, each of the guiding protrusions having a cusp end;
   a guiding sleeve immovable along the rotation axis and rotatable around the rotation axis, the guiding sleeve comprising:
      a plurality of spaced U-shaped blocking protrusions formed on an internal sidewall of the guiding sleeve, each of the blocking protrusions having two legs and a locking groove formed between the two legs; and
      a plurality of releasing channels each formed between each two adjacent blocking protrusions, at least one of the two legs having a second slanted end face matching with the first slanted end faces for directing the corresponding locking protrusion to move into the corresponding locking groove or to move into the corresponding releasing channel;
   a driving sleeve arranged along the rotation axis and configured for being driven to rotate around the rotation axis, the driving sleeve comprising:
      a plurality of spaced retaining protrusions formed on an internal side wall thereof, each of retaining protrusions having a tip end with opposite slanted end faces facing toward the locking shaft; and
      a plurality of engaging channels each formed between each two adjacent retaining protrusions; and
   a restoring spring member having a first end for being fixed to the base body and an opposing second end fixed to the first end of the locking shaft, the spring member configured for applying a pushing force to the locking shaft, the locking shaft being rotatable about the rotating axis for alternately switching between an engaging position where the locking protrusions are lockingly engaged in the corresponding locking grooves, and a disengaging position where the locking protrusions are slidably received in the corresponding releasing channels.

2. The clutch assembly according to claim 1, wherein the restoring spring member is a compressible spring coil.

3. The clutch assembly according to claim 1, wherein the cup is formed with a plurality of cusp structures on an edge thereof and the cusp structures having a plurality of slanted faces matching with the first slanted end faces.

* * * * *